United States Patent [19]

d'Alayer de Costemore d'Arc et al.

[11] 4,411,008

[45] Oct. 18, 1983

[54] METHOD AND APPARATUS FOR CONTROLLING TAPE TRANSPORT APPARATUS IN SEARCH SEQUENCE

[75] Inventors: Stephane M. d'Alayer de Costemore d'Arc; David J. Lockey, both of Brussels, Belgium

[73] Assignee: Staar S. A., Belgium

[21] Appl. No.: 232,199

[22] Filed: Feb. 6, 1981

Related U.S. Application Data

[62] Division of Ser. No. 953,211, Oct. 20, 1978, Pat. No. 4,366,371.

[30] Foreign Application Priority Data

Dec. 9, 1977 [FR] France .............................. 77 37210

[51] Int. Cl.³ .................... G11B 27/14; B65H 59/38
[52] U.S. Cl. .................................. 377/18; 360/72.3; 360/137; 364/562
[58] Field of Search ....... 235/92 MP, 92 DN, 92 EV, 235/92 CC, 92 CA, 92 EA, 92 CT; 360/72.1, 72.3, 73, 74.1, 74.2, 92–94, 134, 137; 242/75.51, 75.52, 191; 340/675, 681; 364/561, 562; 377/3, 16–18

[56] References Cited

U.S. PATENT DOCUMENTS

| | | | |
|---|---|---|---|
| 3,681,575 | 8/1972 | Wolfe .................................. | 340/675 |
| 3,700,320 | 10/1972 | Brewer et al. ........................ | 377/18 |
| 3,834,648 | 9/1974 | Rose, Jr. et al. .............. | 235/92 DN |
| 3,921,220 | 11/1975 | Primosch et al. .................. | 360/72.3 |
| 4,092,680 | 5/1978 | Sander ............................ | 235/92 MP |
| 4,172,231 | 10/1979 | D'Arc et al. ....................... | 360/72.3 |
| 4,177,488 | 12/1979 | Sakai .................................. | 360/72.3 |
| 4,205,354 | 5/1980 | Kramer ................................ | 360/72.1 |
| 4,225,890 | 9/1980 | Takenaka et al. ................. | 360/72.1 |
| 4,237,373 | 12/1980 | Okatani et al. ....................... | 377/18 |
| 4,237,497 | 12/1980 | Trevithick ......................... | 360/72.1 |
| 4,239,957 | 12/1980 | Satoh et al. ........................... | 377/18 |
| 4,280,159 | 7/1981 | Nakayama .................... | 235/92 MP |
| 4,320,423 | 3/1982 | Frey et al. ......................... | 360/74.2 |

*Primary Examiner*—Leo H. Boudreau
*Attorney, Agent, or Firm*—Leydig, Voit, Osann, Mayer and Holt, Ltd.

[57] ABSTRACT

Method and apparatus for controlling tape movement to a given position by utilizing the combination of periodic determinations of tape position by calculation based on reel speed ratios, and monitoring positions represented by counts in a pulse count memory.

10 Claims, 18 Drawing Figures

(I.D. MODE)

(SEARCH MODE)

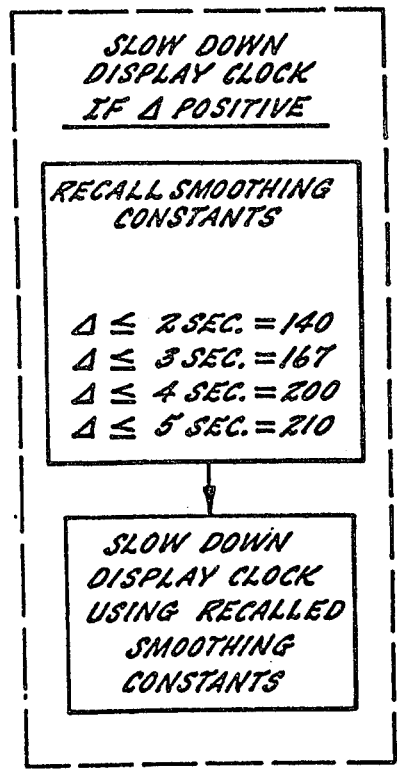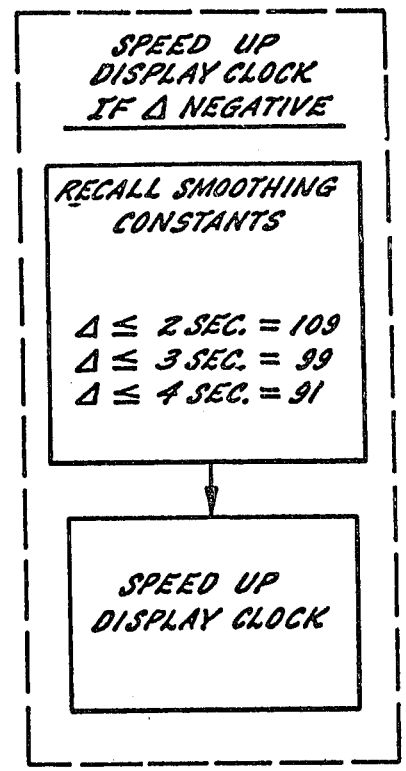

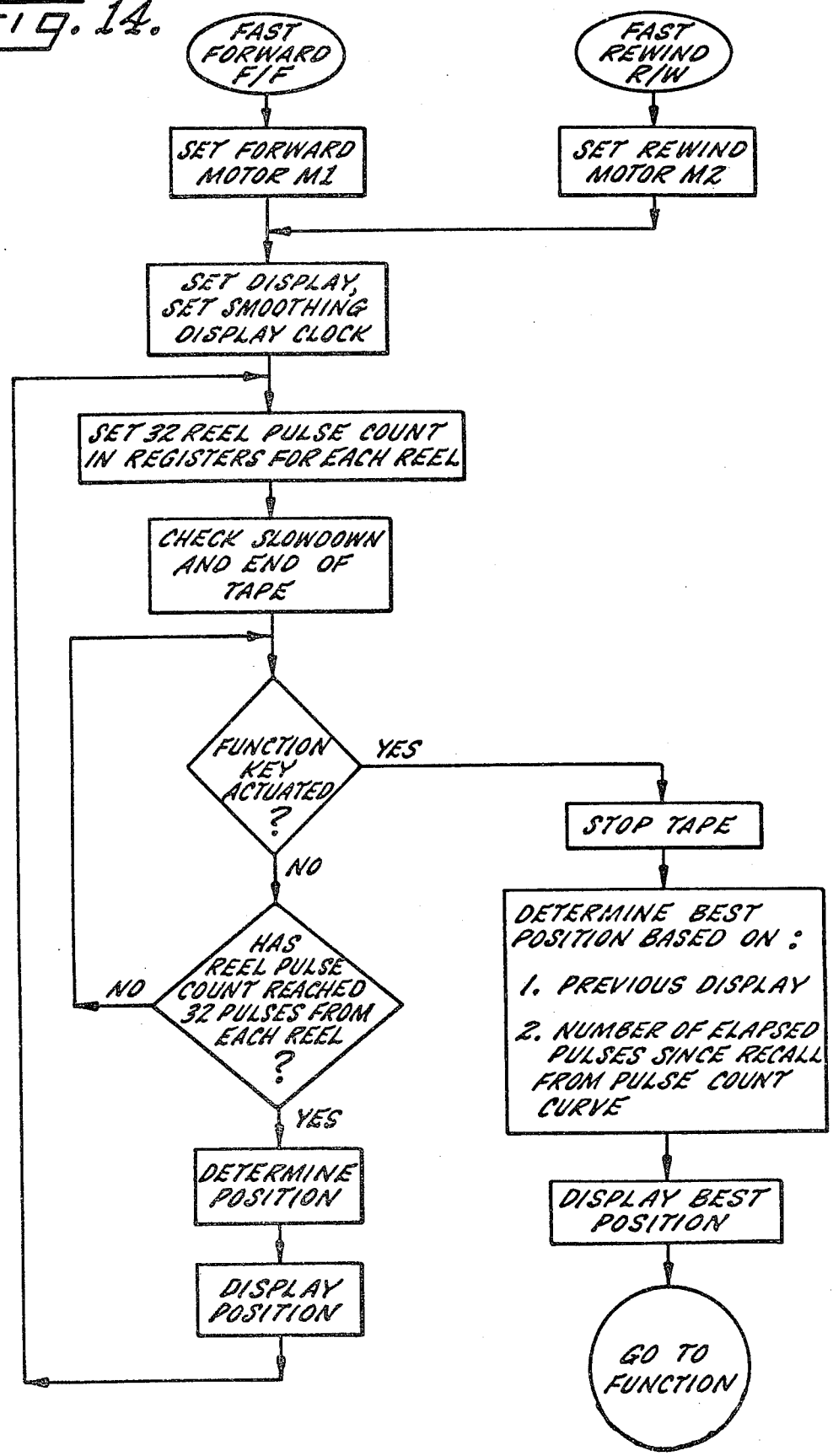

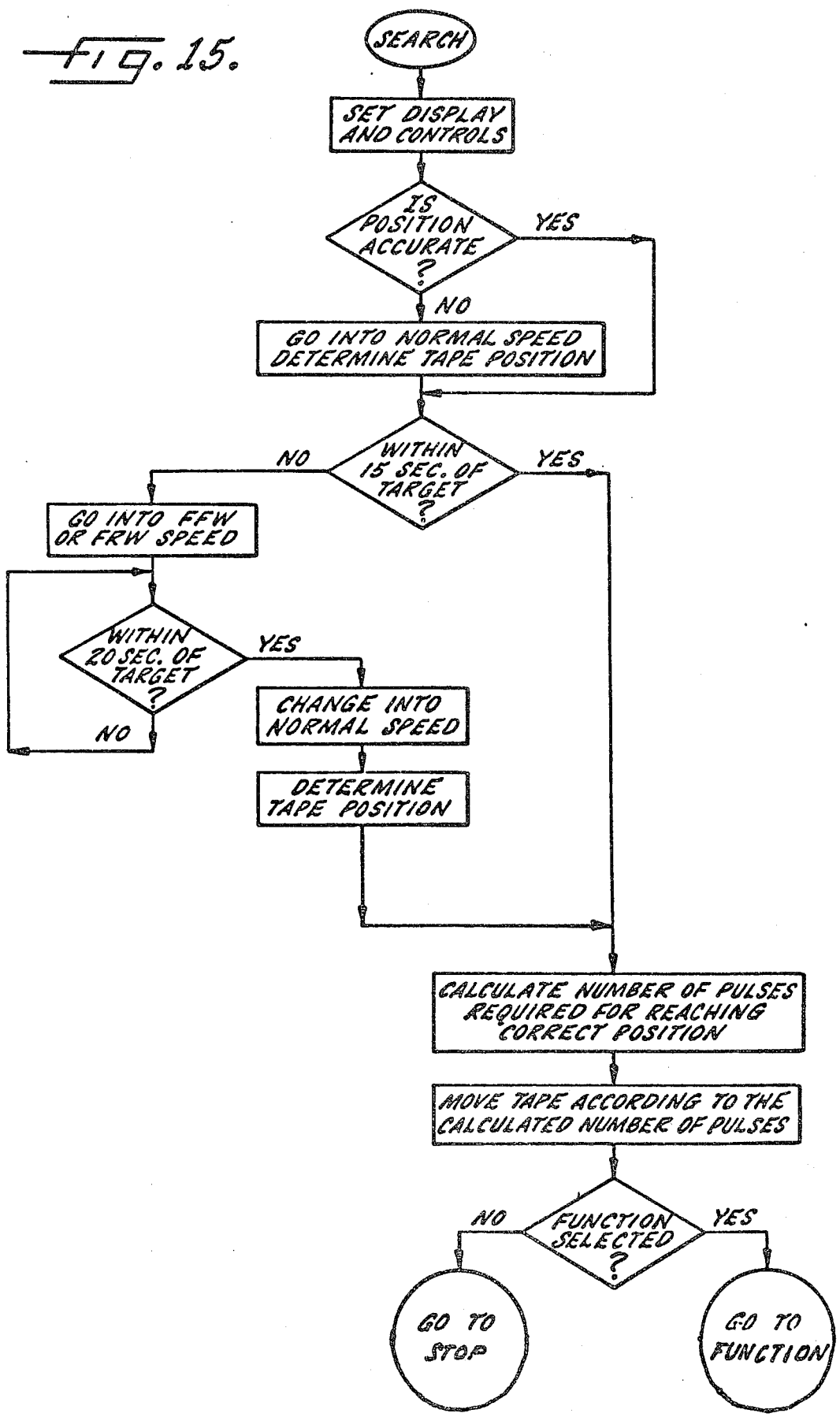

METHOD AND APPARATUS FOR CONTROLLING TAPE TRANSPORT APPARATUS IN SEARCH SEQUENCE

This is a division, of application Ser. No. 953,211, filed Oct. 20, 1978, now U.S. Pat. No. 4,366,371.

BACKGROUND OF THE INVENTION

The present invention relates to improvements in methods and apparatus for transferring a flexible web from reel to reel of a web/reel assembly, and more particularly to tape transport apparatus for tape cassettes and methods for controlling and operating such apparatus. In more detail, the present invention relates to improvements in the method and apparatus disclosed in the commonly assigned prior U.S. Pat. No. 4,172,231 which describes methods and apparatus for accurately determining absolute values of tape position as tape is driven from reel to reel of a tape/reel assembly, and for controlling the apparatus in accordance with such tape position determinations.

The invention of the aforesaid prior application is described therein as useful in transport apparatus for reel/web assemblies the physical parameters of which are known, the physical parameters including the tape length and thickness, and the reel hub diameters. In such a transport apparatus operating with a web/reel assembly having known physical parameters, the position relative to one end of the web of an intermediate portion being transferred from one reel to the other, may be determined by a computational process using mathematical equations, i.e. by following tape position determination algorithms employing constants established by the known physical parameters of that reel/web assembly, and a variable parameter; namely, the ratio of rotational speeds of the two reels as the intermediate web portion is being transferred from one reel to the other, which ratio continuously changes as the web is transferred. It is explained in said prior application that the same algorithms employing the same constants may be followed to determine the position of an intermediate web portion at any stage of transfer of the web; the only input required at any stage is the ratio of the rotational speeds of the reels. By determining tape position in a regularly repeating cycle, using said tape position determination algorithms, and producing each cycle an output signal representing the position determined for the web during that cycle, the output signals may be utilized to monitor the transfer of the web in the apparatus, for example, by displaying the continously changing position of the web or controlling the operation of the transport apparatus.

The method of said prior application is particularly, although not exclusively, useful in tape transport apparatus for cassettes of tape which are a standard type for example, cassettes providing sixty, ninety and one hundred twenty minutes of playing time known, respectively, as C-60, C-90 and C-120 cassettes. Such cassettes are conventional with two reels and different known lengths and thickness of tape to provide the various lengths of playing time. The method entails first establishing constants for each tape cassette, which constants are used in the position determination algorithms, and storing a set of constants for each tape cassette in, for example, a semiconductor memory unit. In tape transport apparatus under the control of a microprocessor, signals representing the set of constants corresponding to the cassette loaded into the transport apparatus, are recalled from the memory unit, intermediate signals are generated representing the ration $P_1/P_2$ measuring the rotational speeds of the reels, and by circuit means such as the microprocessor under program control a determination is made of tape position in terms of the length ($l_1$ or $l_2$) or time ($t_1$ or $t_2$) to the end of the web on either reel of an intermediate portion of the web being transferred from one reel to the other, using position determination algorithms employing the following equations:

$$l_1 = \frac{A}{1 + \left(\frac{P_1}{P_2}\right)^2} - B \qquad \text{Equation (I)}$$

(take-up reel)

$$l_2 = \frac{A}{1 + \left(\frac{P_2}{P_1}\right)^2} - B \qquad \text{Equation (I)'}$$

(supply reel)

wherein $A = L \cdot \frac{T^2 + 1}{T^2 - 1}$ and $B = L \cdot \frac{1}{T^2 - 1}$;

L representing the total length of magnetic tape, $l_1$ representing the used tape, $l_2$ the unused tape, T representing the ratio $P_1/P_2$ when $L = l_2$, i.e. at the beginning of the tape. T is thus a constant which characterizes each type of cassette and which can be determined either mathematically or by experiment.

If the two terms of the Equation (I) and (I)' are divided by L, we obtain the following:

With $\frac{A}{L} = A' = \frac{T^2 + 1}{T^2 - 1}$ and $\frac{B}{L} = B' = \frac{1}{T^2 - 1}$:

$$\frac{l_1}{L} = \frac{A'}{1 + \left(\frac{P_1}{P_2}\right)^2} - B' \text{ and} \qquad \text{Equation (II)}$$

$$\frac{l_2}{L} = \frac{A'}{1 + \left(\frac{P_2}{P_1}\right)^2} - B' \qquad \text{Equation (II)'}$$

It is also possible to multiply the two terms of Equation II and II' by the duration $\tau$ of the cassette, of which the usual types may have the values defined above. We then obtain, with $A'' = A' \times \tau$ and $B'' = B' \times \tau$ the following:

$$t_1 = \frac{A''}{1 + \left(\frac{P_1}{P_2}\right)^2} - B'' \qquad \text{Equation (III)}$$

$$t_2 = \frac{A''}{1 + \left(\frac{P_2}{P_1}\right)^2} - B'' \qquad \text{Equation (III)'}$$

Among the above Equations, (I) and (I)' represent the length of the magnetic tape wound on the take-up reel and on the supply reel respectively, i.e. a position determination in terms of linear dimension. Equations (II)

and (II)' represent the ratios of the length of the magnetic tape wound on the take-up reel and on the supply reel respectively to its total length, i.e. a position indication in non-dimensional terms, while Equations (III) and (III)' represent the time taken by the magnetic tape to reach the radius $R_1$ on the take-up reel and the radius $R_2$ on the supply reel respectively, i.e. a position indication in terms of time, representing the playback time or recording time which has elapsed since the beginning of the magnetic tape or which remains until the end of the magnetic tape respectively.

The sets of constants A, A', A", and B, B', B" for the different types of cassettes are determined statistically, so that account can be taken, with sufficient accuracy, of the very slight variations which may exist between different cassettes of one and the same type and which result, for example, from production tolerances. Constants for the C-120 tape cassette have been measured as A"=72.2496 and B"=5.9961, as an example of constants for use in web position determination using Equation III'.

Accordingly, the present invention is directed to method and means for monitoring the movement of tape in tape transport apparatus for reel/tape assemblies such as cassettes, using tape position determination algorithms specified in the hereinbefore identified commonly assigned prior patent application, for determining absolute values of tape position as tape is driven from reel to reel. Such tape position determinations are based on numerical constants stored in memory and reel rotational speed ratios measured at intervals.

According to the method disclosed in said prior patent application, the rotational speeds of the reels are represented by pulse streams from pulse generators driven responsive to rotation of each reel. Pulses at the rate of twenty per revolution of each reel are fed to shift registers which accumulate the pulses and reel speed ratios are calculated based on the total number of pulses accumulated in the registers. It was recognized that the accumulated total of pulses in a shift register provided only an approximate representation of the instantaneous rotational speed of one of the reels.

It is one of the principal objects of this invention to provide a more accurate measure of instantaneous rotational speed of each reel to base the calculation of reel speed ratios, which is used in the determination of tape position.

According to this invention, instantaneous reel speed ratios are calculated based on the real time for each reel to make two revolutions when driven at normal (play or record) speed, and four revolutions when driven at fast (forward or rewind) speed. In the present case, pulse generators on the reel spindles produce eight pulses (hereinafter called "reel pulses") each revolution of the reel, which pulses are counted. Clock pulses generated at a rate determined by an internal clock, illustratively 4 KHz, are clocked into and accumulated in a timing register for each reel for the time period elapsed until either 16 or 32 reel pulses are counted, the content of each of the timing registers then representing the real time for two or four revolutions of each of the reels; instantaneous reel speed ratios are calculated by dividing the contents of the timing registers.

In the system described in the aforesaid prior patent application, the operator designates that the web/reel assembly or cassette is of one known type or of another type, to derive from memory numerical constants for basing the tape position determinations. This manual selection entails certain risks in cases where the operator makes the wrong choice, for example, by operating the key corresponding to type C-90 when a C-60 type cassette has been inserted, either by inadvertence or through ignorance of the type of cassette. This may result in malfunctioning of the apparatus and possible damage to the magnetic tape. For example, the display of the position of the tape may be incorrect; it may be impossible to find a predetermined position on the tape during the search mode; there may occur premature slowing-down with unnecessary increase of forward winding or rewinding times; there may occur a failure to slow down towards the end of the tape and consequently the risk of breaking the tape.

To overcome these problems, another important object of the invention is to provide a method and means for automatically identifying and designating the type of web/reel assembly or cassette in the apparatus.

According to this aspect of the invention, the unknown web/reel assembly or cassette is identified by first recalling from memory predetermined values of constants, which are called I.D. constants, and then proceeding through a cassette identifying process in which a first tape position determination is made based on the recalled numerical constants, the tape is moved a prescribed distance, a second tape position determination is made, the actual prescribed distance is compared with the theoretical distance between the first and second determined positions and in accordance with that comparison, the unknown cassette is determined to be one of the known types, and thus the unknown cassette is identified. In carrying out the I.D. mode of operation in accordance with the invention, preferably the two positions are determined by operation of a microprocessor under program control using position determination algorithms including one of the equations (I) to (III)' referred to above for computing tape positions employing numerical constants derived from the I.D. constants store, and reel speed ratio is measured as the tape is transferred from reel to reel. The two predetermined positions can be selected in arbitrary manner, and may in particular be fixed by predetermined numbers of revolutions of the reels or pulses supplied by the rotational speed detector or detectors (pulse generators) of one and/or the other of the reels. The process is thus based on measuring the rotational velocity of each of the reels, which velocity is dependent on their characteristics, their state of winding, and the type of tape used.

According to another aspect of the invention, this method for automatically identifying an unknown cassette as one of a plurality of known types, is implemented in tape transport apparatus operated under the control of a controller that includes a central processor unit (CPU) and associated memory units (ROM) for programs and storage of numerical constants representing the cassettes, and constants used in the I.D. mode hereinafter called cassette I.D. constants. Further in accordance with the apparatus aspect of the invention, tape transport apparatus including reel drive motors and motor control circuits therefor, is controlled by the microprocessor type controller to perform the I.D. mode of operation in which the tape is moved from a starting position at normal speed for the first tape position determination, at fast speed to the second position, at normal speed for the second tape position determination, and after the cassette is identified, the tape is returned to the starting position. The microprocessor under program control provides means for determining the first and second tape positions, means for calculating the theoretical difference between the first and second positions, means for measuring the actual difference between the same positions, means for comparing the theoretical and actual differences and in accordance with the comparison confirming that the unknown cassette is of one or of another known type.

Another important object of the invention is to provide a method for carrying out high speed searches for target tape positions, which provides random access to any tape position. While the system of said prior patent application includes a search mode of operation, the present method controls the apparatus to reach a target tape position more accurately and at higher speed than was achievable heretofore.

A related object is to provide a method for monitoring tape movement in accordance with pulses from the reel pulse generator of the apparatus and representing reel movement, using a reel pulse count store correlating tape position and reel pulse counts, the pulse count store providing the number of expected pulses to reach given positions or tape positions corresponding to specified pulse counts.

Another object is to provide method and means for counting pulses representing reel movement, and useful in the search and other operational modes of the apparatus.

In the system described in the prior patent application, a display is operated by the controller to display successive tape positions determined by the controller following several revolutions of both reels. If such display is updated to show the tape position each such determination, the display may jump 6 to 8 seconds at a time and the jumps may be uneven. An important further object of the present invention is to provide a method for operating such a display so that the display is uniformly and smoothly updated to show changes in tape position. For example, where tape position is displayed in terms of time to the end of the tape, it is an objective to operate the display to show changes in tape position of one second, the display being operated by a display clock and the rate of the display clock being synchronized with the actual rate of movement of the tape by comparing the actual tape position as determined each cycle with the tape position shown on the display, and changing the rate of the display clock to eliminate any difference between the actual position and the display position over a prolonged interval, to smooth the operation of the display and synchronize it with tape movement.

Another object of the invention is to provide a tape transport method and apparatus for adjusting the output torque of the take-up reel drive motor to maintain a constant tractive force on the tape throughout the process of transferring tape from the supply reel to the take-up reel, by varying the voltage applied to the take-up motor through multiple step levels approximating a linear change proportional to the quantity of tape wound on the take-up reel.

Further objects and features of the invention will be apparent from the following description of a preferred embodiment of the invention, by reference to the accompanying drawings, in which:

FIGS. 11 and 11a are simplified charts of program steps shown in FIG. 10, in the control of the rate of the display clock to synchronize the display tape position with tape movement;

FIG. 14 is a simplified flow diagram of a preferred program for the CPU to control the apparatus in the fast forward and the fast rewind functions;

FIG. 15 is a simplified flow diagram of a program for the CPU to control the tape transport apparatus in the search mode for a target position.

GENERAL ORGANIZATION OF TAPE TRANSPORT APPARATUS (FIGS. 1, 2)

Figure 1:
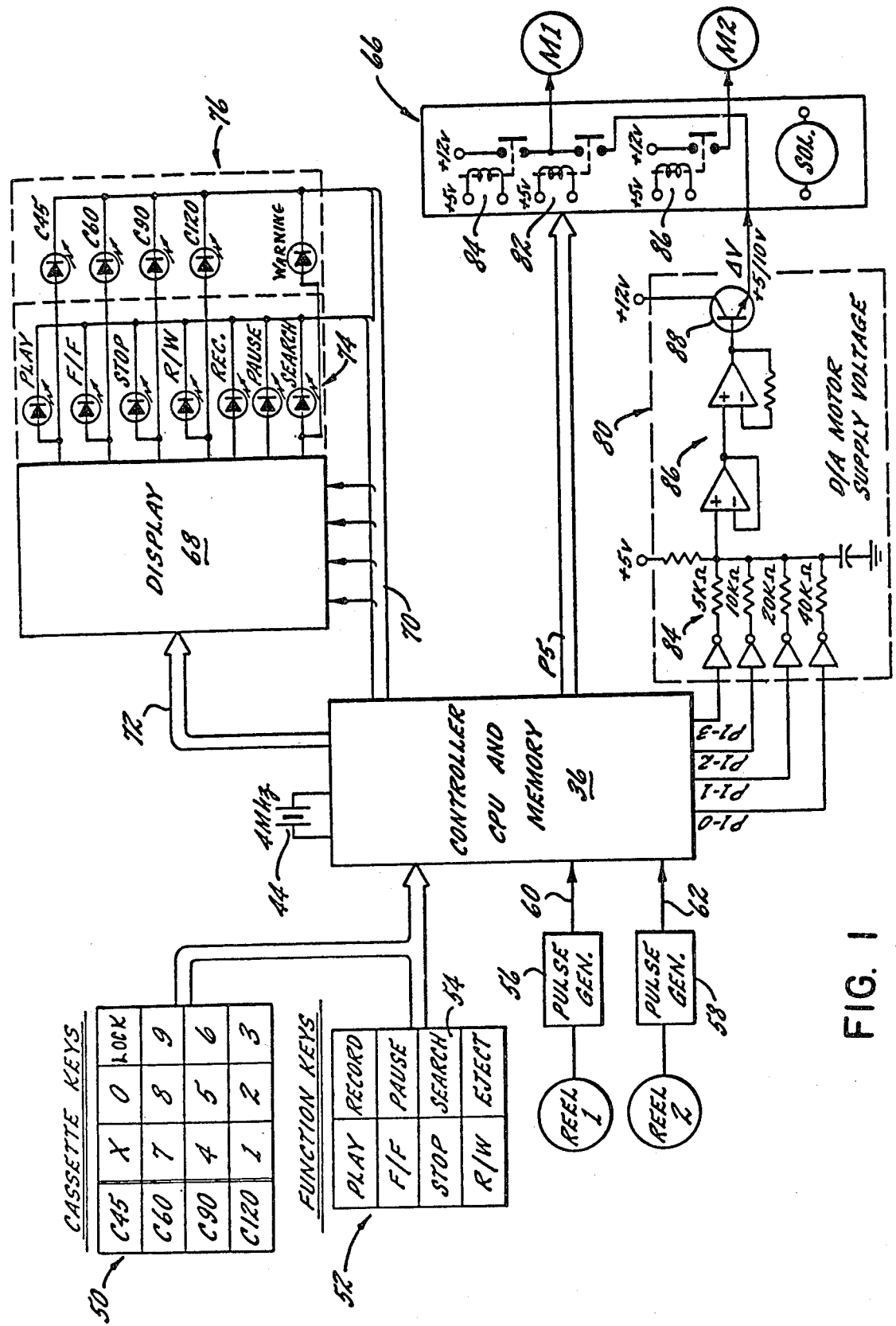
FIG. 1 is a block diagram of a tape transport apparatus including a controller of the apparatus instructed in accordance with the present invention.
Figure 2:
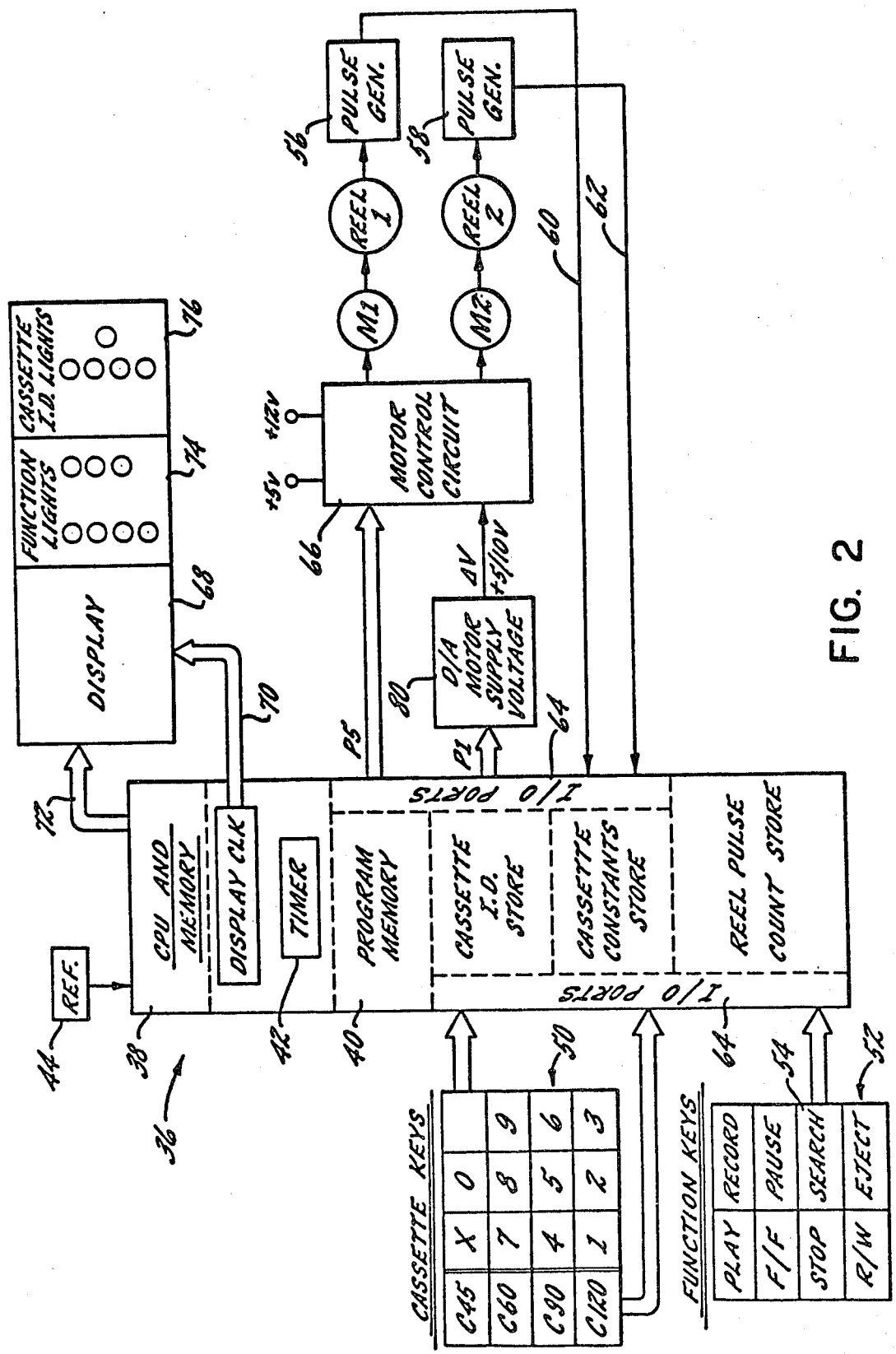
FIG. 2 is a block diagram similar to FIG. 1, detailing the memory sections of the controller and diagramatically illustrating the controller output to the display and motor control circuit for the reel drive motors of the tape transport apparatus.

Now turning to the drawings, FIGS. 1 and 2 are block diagrams of tape transport apparatus having a control system constructed in accordance with the present invention and utilizing the methods of the present invention. The system, in general, includes a controller 36, a motor control circuit for the drive motors of the tape transport apparatus, a display for monitoring tape movement by visually displaying tape position, an operator panel with a key board and control switches, and reel speed detectors herein shown as pulse generators supplying information on reel speed to the controller 36. In the preferred form of the invention the controller 36 is comprised of a set of integrated circuit chips forming a microprocessor, an exemplary and preferred microprocessor being the Mostek F8 which includes a CPU unit 38 and one or more ROM memory units 40. As indicated in FIG. 2, the controller 36 includes a timer 42, which in the case of the Mostek F8 microprocessor is provided by the memory unit 40, and has an external reference frequency input 44 which provides a time base so that the timer is operable in real time.

While it is preferred to utilize a Mostek F8 family of chips to provide a microprocessor based controller 36, it will be appreciated that other microprocessors are available and may be used to serve the same functions, and that the controller may be implemented using other equivalent electronic devices. When implemented with the Mostek F8 chips, the F8 CPU provides 64 bytes of RAM that may serve various register functions unique to the present invention, as well as provide read/write memory for arithmetic and logic functions. The CPU among other circuits also includes an arithmetic logic unit, an accumulator, I/O ports, clock circuits, and interrupt logic which allows CPU operation to be interrupted by a timer on the ROM chip or by an external source. One or more F8 ROM chips provide for storage of programs, I/O ports, a timer and program counter and stack register which handle the program function. With this construction, direct interfaces can be made by the controller 36 with peripheral devices since the CPU circuits provide, for example, encoding and decoding circuits for operating a display. The ROM's also provide for storage in coded signal form of the various unique constants required for cassette identification, search for target positions and other tape control functions performed by the apparatus, labeled in FIG. 2 as memory sections or blocks Cassette I.D. Store, Cassette Constants Store and Reel Pulse Count Store.

Operator activated inputs to the controller 36 are provided from an operator panel having one keyboard for digit keys 0–9, a cassette identification mode key 48 labeled "I.D." and cassette keys 50 labeled C-45, C-60, C-90 and C-120, and a second keyboard with function keys 52 labeled play, record, stop, etc. which also includes the search mode key 54.

Apparatus activated inputs to the controller 36 include detectors of speed of the reels of the cassettes or open web/reel assemblies in the tape transport apparatus, herein shown as including pulse generators 56, 58 on the spindles for reel 1, reel 2 respectively. Preferably the pulse generators 56, 58 are constructed to provide pulses at a rate representing reel angular velocity or rotational speed, and eight pulses per revolution of each reel is preferred for the rate, although the rate of pulse generation may, of course, be varied, and the speed detectors may, if desired, take other forms. Pulse streams or "reel pulses" from the pulse generators 56, 58 representing the rotational speed of the reels are supplied over input lines 60, 62 to the input/output ports 64 of the controller 36.

Figure 3:
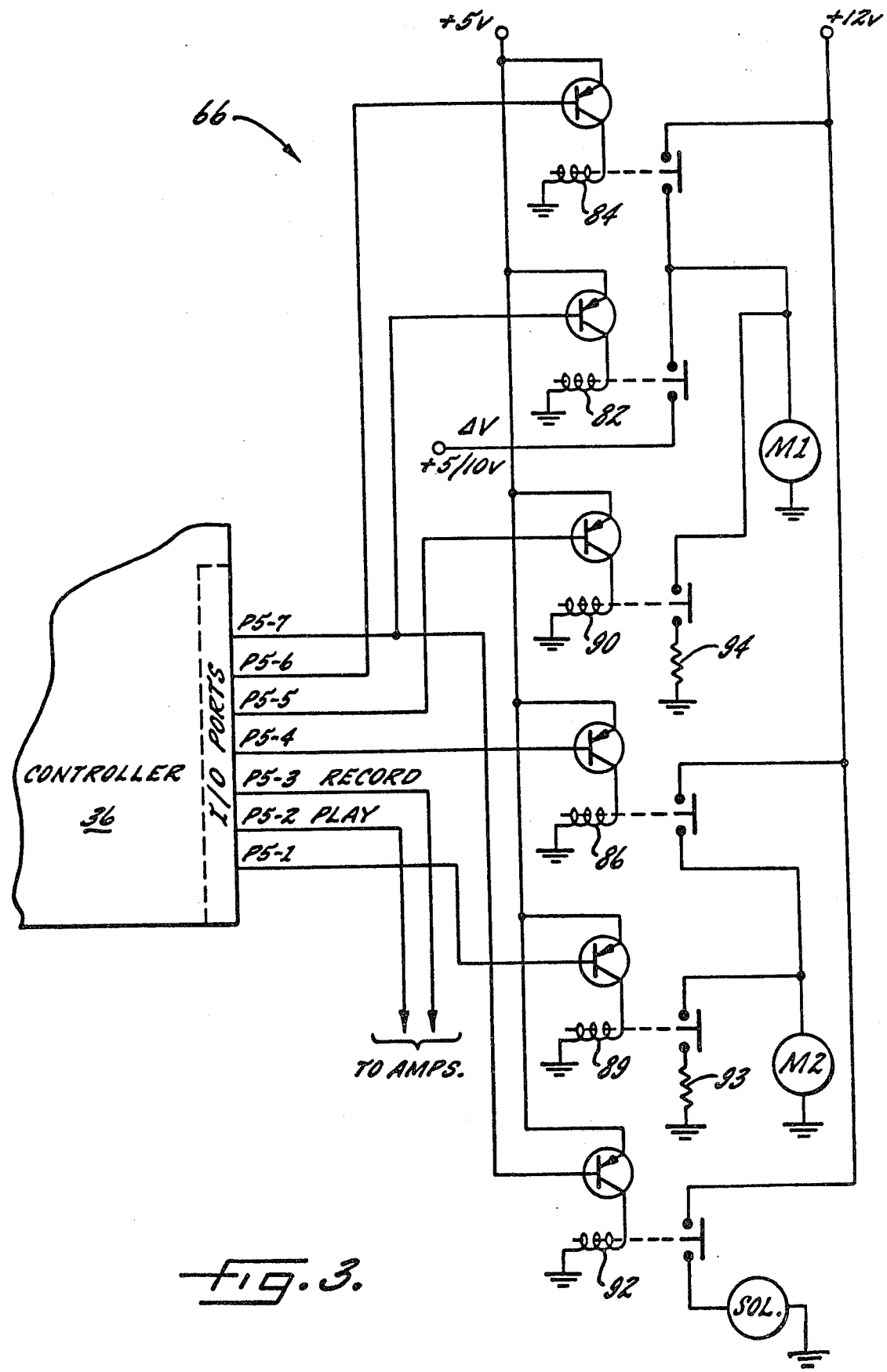
FIG. 3 is a simplified schematic diagram of a motor control circuit shown in block diagram form in FIGS. 1 and 2.

The tape transport apparatus includes drive motors M1 and M2 for the reels of the cassette or web/reel assembly which are controlled by a motor control circuit 66, which in turn is controlled by the controller 36. As indicated in FIG. 3, the motor control circuit 66 is connected over a set of output lines to the input/output ports of the controller 36, the lines being labeled P5-1, P5-4 to P5-7 collectively labeled P5 in FIGS. 1 and 2. In the present preferred form of the invention, the drive motors M1 and M2 of the tape transport apparatus are operable to drive the tape in play or record mode in one direction and in fast modes (fast forward or rewind) in both directions. Preferably the motors are of the type which may be adjusted in speed by varying the supply voltage to the motor windings, illustratively a 12 volt supply causing the motors M1 or M2, to operate at fast speed, the motor M1 serving as the take-up reel drive motor in forward direction, and the motor M2 serving as the take-up motor in the rewind direction. Circuits are conventionally provided for braking the supply reel by connecting the motor windings through resistances to ground to provide dynamic braking or through a mechanical brake.

The system provides for operation of the display 68 by the controller 36 over output lines 70 and 72 which, in the preferred form of the invention, serve to drive the display to show in terms of time the position of the tape in the tape transport apparatus. Illustratively the display will be in minutes and seconds, the display having 4 digits, a higher order and lower order digit for the minutes and a higher order and a lower order digit for the seconds. Associated with the display are a set of lights 74 which are energized to indicate the functions being carried out by the apparatus under direction of the controller 36, such as play, fast forward, search, etc. Another set of lights 76 is used to display the type of cassette in the apparatus, those lights being labeled C-45, C-60, C-90 and C-120. The function lights and cassette lights 74, 76 are driven from output lines 70 and through connections including the CPU circuits from the cassette keys 50 and function keys 52, so that manual activation of one of those keys also results in energizing the corresponding function or cassette light.

In somewhat more detail, the display 68 is operated by a display clock which is preferably served by a register of the CPU 38 of the controller 36, the display clock operating to update the display in synchronism with the movement of the tape as tape is moved from one reel to the other of a cassette or web/reel assembly.

In keeping with the invention, the motor control circuit 66 is supplied with output signals from the input/output ports 64 of the controller and also with a variable supply voltage $\Delta V$ between five to ten volts which is connected to the take-up reel drive motor M1 via operation of a relay in the motor control circuit 66. The variable supply voltage is produced by the controller 36 in accordance with the tape position by placing a digital representation of the calculated supply voltage on a set of four output lines labeled P1-0 through P1-3 which represent connections to input/output ports 64 of the controller 36. A circuit 80 schematically shown in FIG. 1 converts the representation of calculated supply voltage on combinations of the output lines P1-0 through P1-3 to the supply voltage for the take-up drive motor and thus serves as a type of digital to analog converter circuit to produce the desired variable motor supply voltage.

Preferably, in carrying out the various aspects of the present invention, programs for controlling the processor 38 are stored in the program memory section of the controller 36 as indicated in FIG. 2. It should be recognized that while it is preferred to perform the methods and implement the apparatus of this invention by a microprocessor under program control, the invention is not so limited and may be implemented by analogue circuits or discrete digital circuitry.

TAPE POSITION DETERMINATION (FIGS. 2, 4, 12)

In accordance with the present invention, it is preferred to operate the CPU 38 of the controller 36 under program control to determine the absolute value of tape position in terms of time to the end of the tape on the takeoff reel. Such a position determination will be displayed by minutes and seconds on the display 68. Tape position determination is made by calculations following position determination algorithms employing equation III' which, it will be recalled, requires the ratio of rotational speeds of the reels and numerical constants A", B" uniquely characterizing the physical parameters of the particular type of cassette or web/reel assembly loaded in the tape transport apparatus. In keeping with the present invention and as disclosed in the prior patent application, numerical constants for the different known types of cassettes illustratively C-45, C-60, C-90 and C-120 are stored in a "Cassette Constants Store' provided by the memory unit 40 of the controller 36. Such numerical constants A", B" are recalled from memory in the course of operation of the CPU under program control to carry out the position determination algorithms. The ratio of rotational speeds of the reels is measured from the pulse streams received from the pulse generators and representing the rotational speeds of the reels 1 and 2. In the prior patent application, pulses emanating from the pulse generators were counted and the speed ratio measured by the ratio of the pulse count $P_2/P_1$. The ratio is taken after a predetermined angular rotation of the slower reel, i.e. after two or more complete revolutions of both reels. In order to improve the accuracy of the tape position determination, it is now proposed in accordance with the present invention to time the period for a predetermined number of revolutions of both reels, and measure the speed ratio based on the ratio of measured times.

Figure 4:
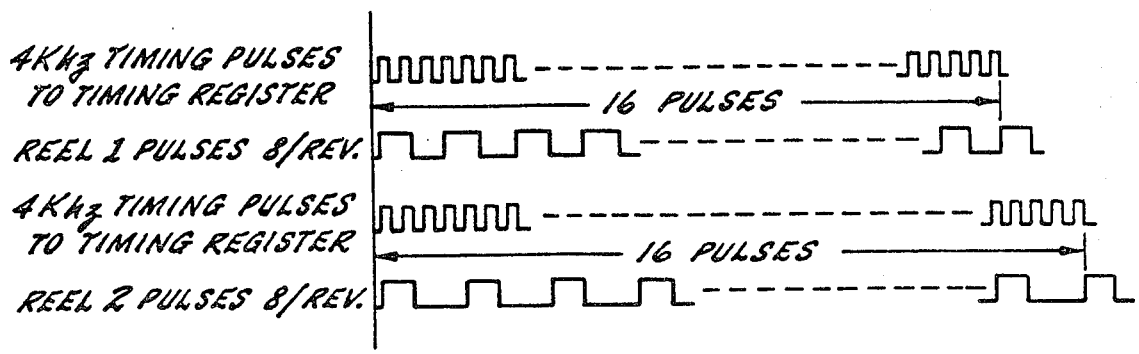
FIG. 4 is a timing diagram illustrating the timing of two reel revolutions by means of timing pulses for an elapsed period represented by sixteen reel pulses.

In the present case means for measuring actual time is provided by the timer 42 of the controller 36. With the pulse generators 56, 58, providing eight pulses per revolution, 16 pulses from either pulse generator represents two complete revolutions of a reel. As shown in FIG. 4, 16 reel pulses are timed by accumulating high frequency pulses in a timing register which may be provided by one of the scratch pad registers of the CPU or by memory included in the controller 36. The high frequency pulses accumulated in the timing register represent the elapsed time $T_1$ for two revolutions of reel 1. Similarly, the elapsed time $T_2$ is measured off for two revolutions of reel 2. The ratio $T_2/T_1$ is calculated by division, such as by dividing the content of one timing register by the content of the other timing register to provide an equivalent reel speed ratio to the ratio $P_2/P_1$ derived by calculating the ratio of accumulated reel pulses as explained in the prior patent application. By measuring instantaneous speed ratio as shown herein, by timing sixteen pulses for each reel, the present invention provides a more accurate representation of instantaneous speeds of the reels, and thus a more accurate representation of the ratio of instantaneous speeds to provide the requisite rotational speed ratio for use in the equation III' to determine tape position.

Referring to equation III' as hereinbefore set forth, it will be seen that to make a calculation for $t_2$ requires constant A" and B" plus the ratio of $P_2/P_1$. To calculate $t_2$ by the CPU under program control requires straightforward programming. The measured ratio of rotational speeds of the reels, based on the ratio of times $T_2$ divided by $T_1$, it will be appreciated, serves for the required ratio $P_2/P_1$ in the denominator of the fraction of equation III'.

While FIG. 4 illustrates timing the period of 16 reel pulses, the number may be varied as desired. For example, for determination of speed of the reels when tape is driven at fast speed, the CPU is preferably programmed to time 32 pulses from each reel, representing four revolutions of each reel. It will be recognized that the intermediate portion of tape for which a tape position determination is made, is that portion being transferred from reel to reel while the speed ratio is determined. The longer the period of determination, the less precise the position determination. To provide a more accurate position determination, at normal play speed, it is preferred to program the CPU to time 16 pulses which provides a more accurate measure of the speed of the tape.

Figure 12:
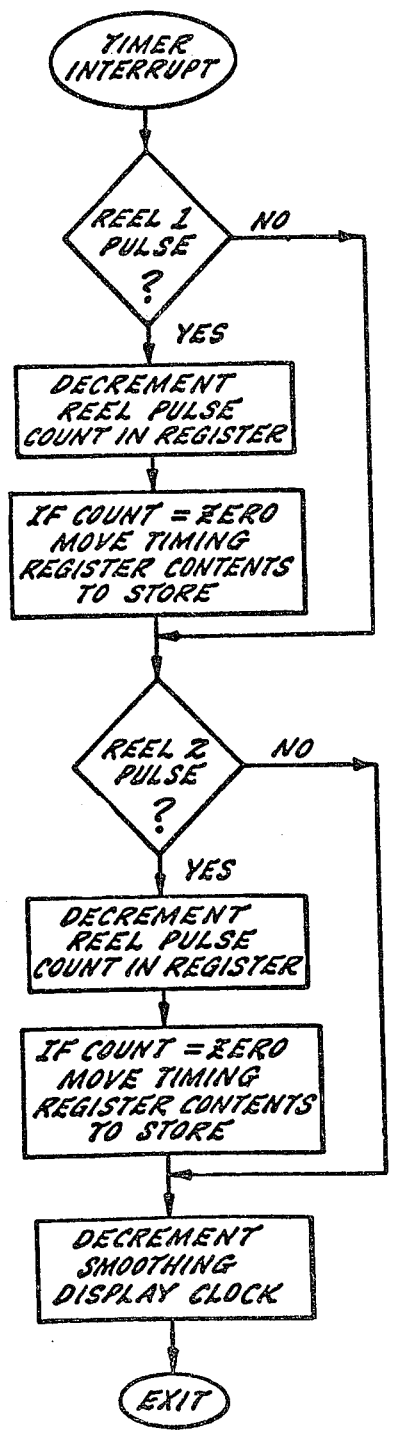
FIG. 12 is a simplified flow diagram of a sub-routine executed by the CPU in response to an internal interrupt initiated by the timer of the controller.

Referring to FIG. 12, this simplified flow diagram illustrates the program routine followed by the CPU in response to a timer interrupt request from the timer on the ROM. The timer interrupt request may be initiated at any preselected time interval such as the time base clock frequency of 4 KHz or one-quarter millisecond. As shown in FIG. 12, the input lines from the pulse generators are tested and as pulses appear on one or the other of the input lines, registers for each reel which are initially set to a count of 16 are decremented until zeroed. Pulses at a rate determined by an internal master clock are clocked into and accumulated in a timing register for each reel, for the period of 16 pulses. When the count reaches zero, after 16 pulses have been received from the associated reel pulse generator, accumulated clock pulses for the 16 reel pulses are moved from the timing register to another register and stored, the content of that register then representing the actual or real time for 16 pulses. A speed ratio determination is made by dividing the content of one register with the content of the other register, producing a speed ratio for use in the tape position determination equation III'.

AUTOMATIC CASSETTE IDENTIFICATION (FIGS. 5, 9, 13, 13A)

Figure 5:
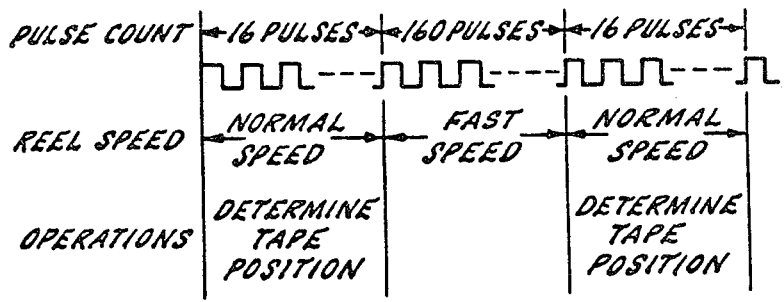
FIG. 5 is a timing diagram illustrating pulse count, reel speed and operations performed in the programmed operation of the microprocessor control in the I.D. mode.

As above mentioned, it is desired to provide a method and means for automatically identifying and designating the type of web/reel assembly or cassette loaded in the tape transport apparatus. For this purpose, referring to FIGS. 5, 9, 13 and 13A, the invention provides a cassette identification process generally shown in the timing diagram of FIG. 5 and described in flow diagram in FIGS. 13 and 13A. As indicated in FIG. 5 the identification process generally involves determining a first tape position (Position I) based on reel speed ratio measured for two revolutions at normal speed and a set of I.D. constants derived from the I.D. store. Then the tape is moved a prescribed distance at fast speed, and a second tape position determination (Position II) is made, again based on speed ratio measurements at normal speed and the I.D. constants. Thereafter, the actual distance between Position I and II is compared with the theoretical distance and based on that comparison, the unknown cassette is determined to be one of the known types, and thus the unknown cassette is identified.

Figure 9:
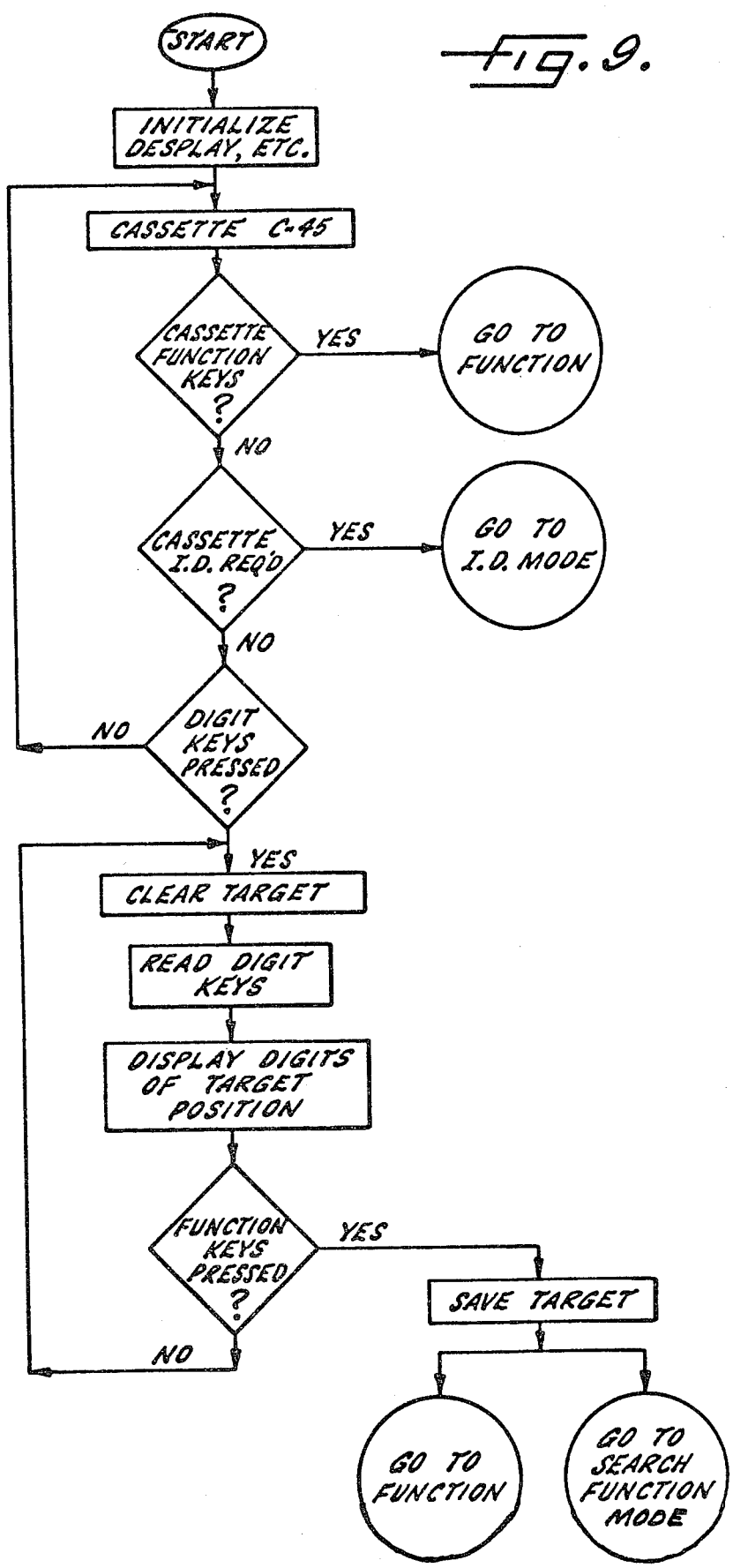
FIG. 9 is a simplified flow diagram of a preferred program for the central processor of the microprocesser type controller, illustrating the initial series of program steps at the start of the main program.

In more detail, referring to the simplified flow diagram illustrated in FIG. 9, the operations carried out by the controller 36 to control the tape transport apparatus are illustrated in flow diagram form, and while all steps carried out are not illustrated, FIG. 9 does show the principle operations which are performed at the beginning of the main program for the controller 36. Thus as indicated in the start block, the tape transport apparatus power is turned on and the circuits are energized including the display circuits, and assuming that a cassette has been loaded into the apparatus by the operator, under the direction of the program, the system in effect assumes that a C-45 cassette has been loaded in the apparatus, as indicated by the block "C-45 cassette" unless a different cassette is specifically identified by the operator designating through the cassette keys 50, one of the other types of cassettes for which data is stored in memory of the controller 36. It will be noted that one of the cassette keys labeled X in FIG. 1 is provided for a cassette of a nonstandard type, so that the system is operable with nonstandard cassettes as well as standard type cassettes.

Returning to FIG. 9, as indicated in the diagram, the program proceeds to the block "Cassette I.D. Required?" and if the answer is "yes", the program branches to the routine for automatic identification of cassette type, herein designated as the "I.D." mode. The I.D. mode is shown in simplified flow diagram form in FIGS. 13 and 13A. Before turning to those Figures, as shown in FIG. 9 if the cassette has been designated, the program proceeds to the block "Digit Keys Pressed?" and if "yes," representing a target position for the search mode of operation, the keys are read, the target position displayed, and the program proceeds to the search function mode or the function designated by the control keys or switches of the operator panel.

Figure 13:
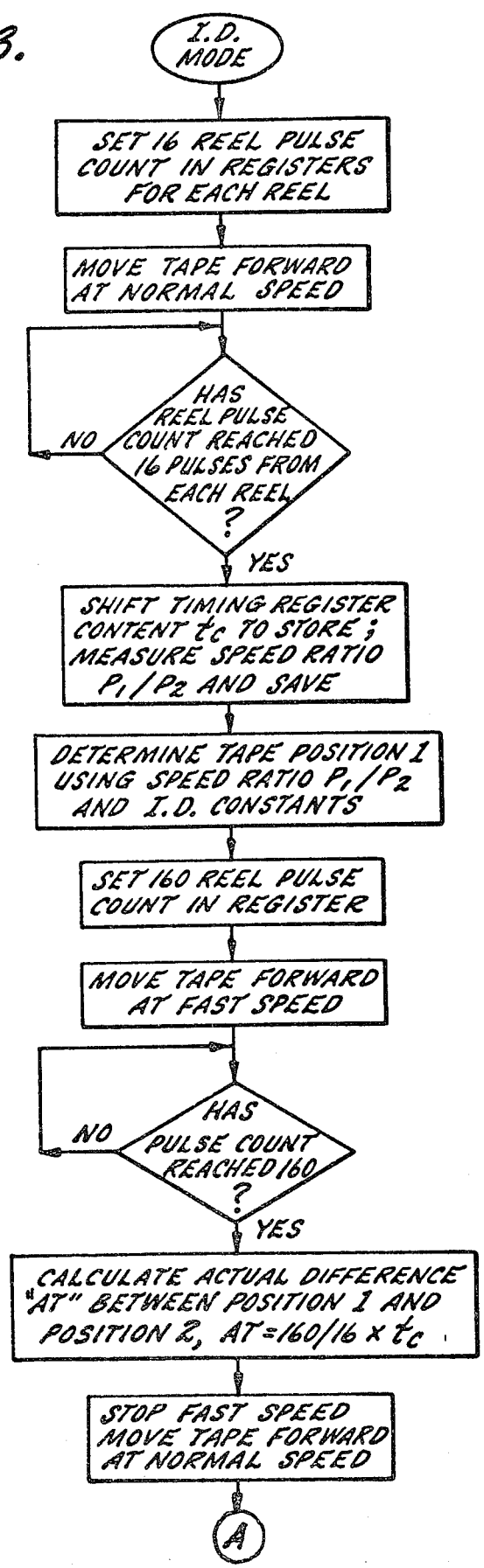
FIGS. 13 and 13a are simplified flow diagrams of a preferred program for the CPU to control the apparatus in the cassette identification mode of operation.
Figure 13A:
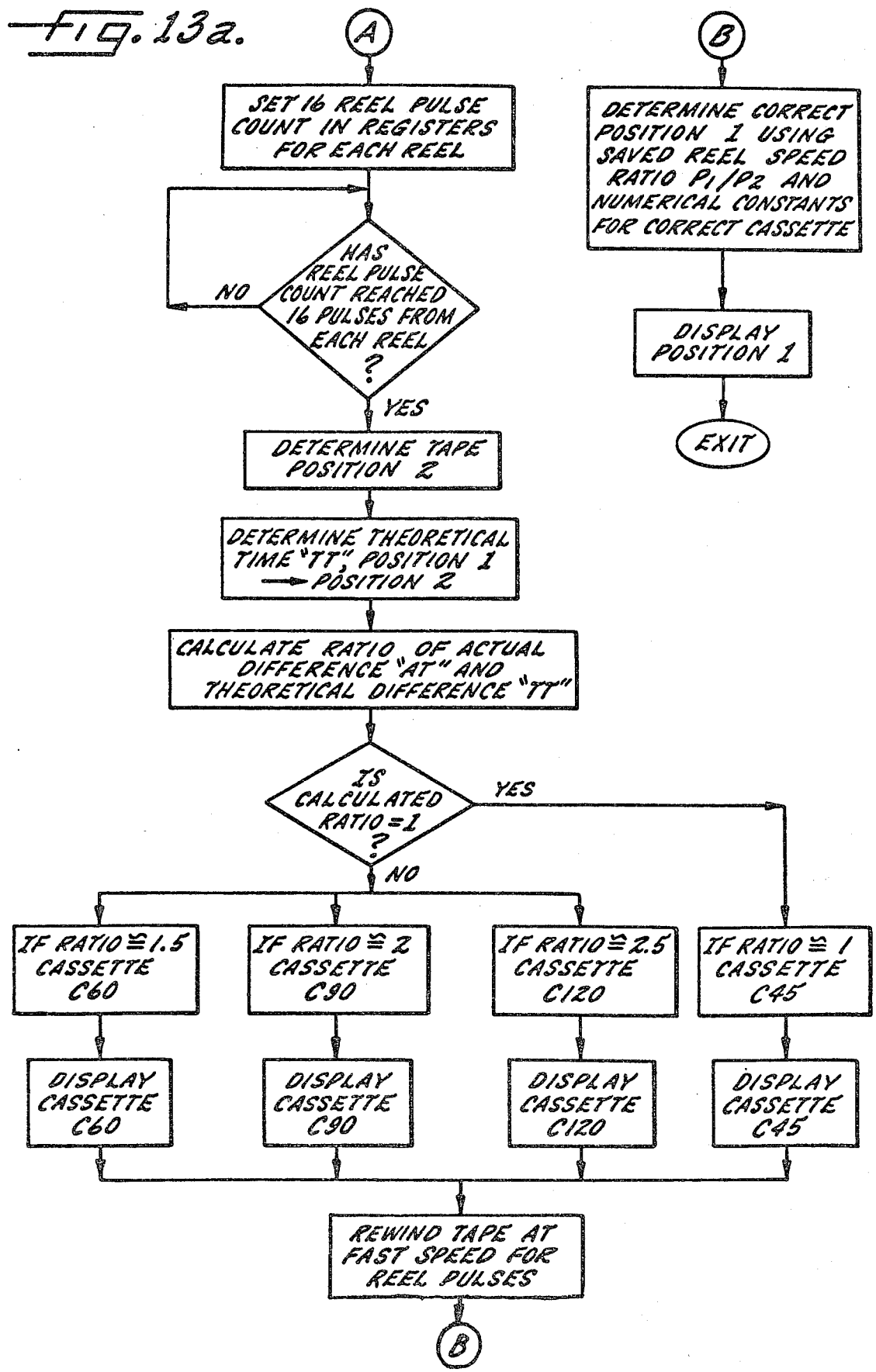

Now turning to FIGS. 13 and 13A, these figures taken together represent the routine of operations carried out by the CPU to identify the type cassette in the apparatus as being one of several known types, the numerical constants for which representing physical parameters of the known cassettes, are stored in the cassette constants section of the memory unit 40 of the controller 36. Referring also to FIG. 5, this is a schematic timing diagram to illustrate the operations carried out by the transport apparatus under control of the controller 36 in the I.D. mode of operation. Thus as indicated in FIG. 5, the tape is driven at normal or play speed for the period of 16 reel pulses for each of the reels. A First tape position (Position I) is determined based on the ratio of reel speeds. The tape is then driven at fast speed for an arbitrary preset period measured on one of the reels, illustratively 160 reel pulses (representing 20 revolutions), then the movement of the tape is reduced to normal or play speed and the tape is driven at that speed for a period of 16 reel pulses from each reel pulse generator. A second tape position (Position II) determination is made based on the ratio of reel speeds during that second period of movement of the tape at play speed.

Referring now to FIG. 13 and 13A, the operations of the CPU under program control to carry out the movements of the tape described in FIG. 5, are illustrated in flow diagram form. Thus after entering the I.D. mode and performing various initializing functions a 16 reel pulse count is set in registers, one register for each reel. The tape is moved forward at normal speed. The tape continues to move forward at normal speed until the question "Has Reel Pulse Count Reached 16 Pulses From Each Reel?" is answered "yes". Using the timing registers hereinbefore described, the reel speeds are represented by high frequency timing pulses clocked into the timing register for 16 reel pulses, and the reel speed ratio, represented by the convention $P_1/P_2$ is measured and that ratio is saved.

The first tape position is determined by a tape position determination algorithm including equation III'. "Position I" is stored in memory. The program then proceeds as indicated and an 160 reel pulse count is set in a register. The tape is moved forward at fast speed until a period of 160 reel pulses of one reel (assume reel 1) is measured off. When the question "Has Pulse Count Reached 160 Pulses?" is answered "yes", the fast speed is stopped and the tape is then moved forward at normal speed for a second position determination. The actual distance between Position I and Position II is first computed using the ratio 160/16 and computing (160/16) $*t_c$, where $t_c$ is the contents of the timing register for reel 1, i.e. the total high frequency clock pulses accumulated in the timing register for 16 reel pulses during the Position I determination, representing the elapsed time for 16 reel pulses measured at normal speed and thus the distance in terms of time the tape moves during two revolutions of reel 1.

As shown in FIG. 13A, the tape is driven for a period of 16 pulses for each reel to base the second tape position determination. In the determination of the second tape position (Position II) as well as the first tape position, the numerical I.D. constants are derived from the I.D. constants store section of memory unit 40. Thus both the first and second positions are theoretical in the sense that the tape position determinations are based on special I.D. numerical constants, while the cassette that is in the apparatus is unknown. The difference between the first and second positions, the theoretical distance in terms of time "TT" is then computed. The actual distance between the first position and the second position which was previously computed is compared with the theoretical distance by calculating the ratio between "AT" and "TT". Stored in the I.D. store memory unit of the controller 36 are a set of identifier constants which represent, for each type of cassette, a range of the ratio between "AT" and "TT". By recalling those constants and fitting the calculated ratio in one identifier range, the particular cassette type is identified and displayed as by means of energizing the cassette light. The tape is then rewound at fast speed for a period determined by decrementing a register storing pulses as the forward movement during the I.D process, to return the tape to the position at which it was originally inserted. The tape position is calculated using the numerical constants for the correct cassette from the store of cassette constants, and the tape position is displayed.

If as the result of an error in calculation, faulty movement of the tape, or the like, the calculated ratio between actual time "AT" and theoretical time "TT" does not fit within a range of cassette identifier constants value (within a given margin) stored in memory for the types of cassettes used, the cycle of operations will be repeated to determine the value of the ratio.

The tape may move at any speed, preferably at the highest possible speed in order to reduce the time taken for the automatic identification process, but it must also permit accurate measurement of the spaced, first and second instantaneous positions. A good compromise is obtained by running the tape at normal speed for play, in order to calculate the first and second positions very accurately, and utilizing a fast speed between these positions.

It is also desired to ensure that if the end of the tape is reached during the operation of automatic identification, to stop the process and automatically rewind the tape sufficiently to enable the process to be carried out.

Since the end portions of the tapes are usually of a different thickness from that of the magnetic tape itself, it is advantageous to run a few centimeters of tape when a cassette is introduced, before starting the identification measurements, so as to avoid inclusion of this end portion in the detection operation in the event of the cassette being introduced at the beginning of a tape. Once the identification of the type of cassette has been effected a length of tape corresponding to the total identification phase is automatically rewound in order to return to the starting point. In order to do this, it is sufficient as above noted to accumulate in a register the total number of pulses from the pulse generator of one of the reels during the entire identification phase in question, and then rewinding the tape and decrementing the register until it zeros out upon receiving an identical number of pulses to find the original starting position.

The numerical I.D. constants derived from the I.D. store and used in determining the theoretical positions I and II, preferably are special simple constants and are not required to be precisely equal to constants measured for standard type cassettes. These I.D. constants correspond to a "known" type of cassette in the general sense of corresponding to a theoretical cassette. These constants may be close to the constants for C-45, or any other standard type of cassette, the identifier range accomodating such variation.

OTHER CONTROLLED FUNCTIONS-PULSE COUNT STORE (FIGS. 7, 9, 14)

Further in carrying out the invention, as shown in the flow diagram of FIG. 9, with one or more of the function keys pressed, the main program branches to routines to operate the CPU to control the tape transport apparatus in those functions. For example, the fast forward and fast rewind functions are controlled by programmed operation of the CPU 38, and a simplified flow diagram of the steps of the program is shown in FIG. 14. As indicated in this flow diagram, when the fast forward or fast rewind loops are entered, the first step in either loop is to set the motor control circuit, illustratively an output signal from the controller 35 over one of the output lines P5-7 or P5-4 to energize a relay to connect the forward motor M1 or rewind motor M2 to a source of voltage at 12 volts driving the motors at fast speed and also to set the display to show tape position. Tape position may have been calculated during the main program and be stored in a display register. The next operation performed in this sequence as indicated in the flow diagram is to set a register for each reel with a count of 32. At fast speed, position determinations are preferably made every four reel revolutions represented by 32 pulses received from each reel pulse generator 56, 58 indicated when these registers zero out. The period of the 32 pulses is timed for each reel, and reel speed ratio is based on the ratio of measured times. Since tape movement is at fast speed, the display may be smoothly updated based on position determinations every four instead of every two revolutions as at normal speed.

In the programmed sequence the other function keys are checked and if none of the search, play or record keys are pressed the fast forward and fast rewind sequences continue, the next step being to determine the position of the tape, preferably using position determination algorithms employing equation III' and the ratio of measured times for 32 reel pulses for each reel, and then displaying the determined position. The fast forward and fast rewind programs loop, the slow-down calculation and end-of-tape time out are checked again, and the loop repeats until one or the other of the function keys is pressed in which case the fast forward or fast rewind sequence terminates in favor of the selected function, or the tape reaches the end. Since the tape may be stopped between calculated tape positions 32 reel pulses apart, an estimated position determination is then made, based on the previous calculated position, stored in the display register, and the number of elapsed pulses since. An accumulator or register routinely stores pulses from the pulse generators 56, 58, and the accumulated total of pulses representing distance of the tape from the previous calculated position, is then utilized to locate the final position and to update the display.

In accordance with an important feature of the invention, tape movement is monitored in the apparatus according to reel pulses from the pulse generators, by means included in the controller 36 and data derived from the "Reel Pulse Count Store" in the memory unit 40. This aspects of the invention enables accurate location of final tape position when the fast forward or rewind function is stopped, and finds other important uses as will be seen later.

Figure 7:
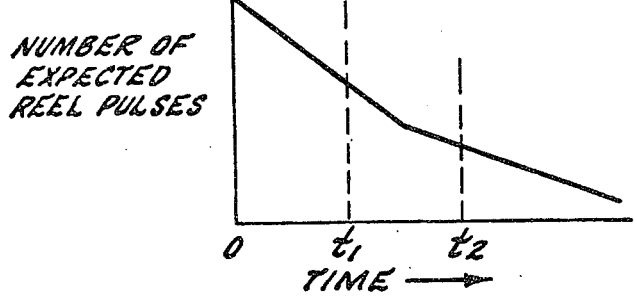
FIG. 7 is a graphical representation of the pulse count curves stored in the memory section of the controller.

Thus, for each of the known standard types of cassette, the memory unit 40 stores the data graphically illustrated by the pulse count curve in FIG. 7, so that the CPU under program control is operative to derive expected pulse counts between tape positions. The data for the pulse count curve shown in FIG. 7 for one of the types of cassettes, is obtained directly or indirectly by rotating the cassette reels and taking total reel pulse counts periodically. For example, after two revolutions of one reel, representing within 3+ seconds of the very end of the tape, 16 pulses have been accumulated. After one hundred revolutions, 800 pulses have been accumulated, the position of the tape then being, in terms of time, about 180 seconds, or 30 minutes from the beginning.

| C-60 Cassette | | | |
|---|---|---|---|
| Pulse Count | | Distance to End of Tape | |
| Number of Revolutions | Reel Pulses | Inches | Time at normal play speed |
| 1 | 8 | 2¼" | ≅ 1.5 seconds |
| 2 | 16 | 4½" | ≅ 3 seconds |
| . | | | |
| 100 | 800 | 300" | ≅ 3 minutes |
| . | | | |
| 500 | 4000 | 1600" | ≅ 15 minutes |
| . | | | |
| 850 | 6800 | 3200" | 30 minutes |

The above table of data is provided to illustrate how the data may be obtained for the reel pulse count store and is exemplary only, the values given being approximate for explanation purposes. Thus, assuming the take-up reel is empty and the reels are rotated to transfer tape from the supply reel to the take-up reel, and assuming the outside diameter of the reel spool to be approximately ¾ inch, the distance travelled per revolution with the spool empty is approximately 2¼ inches, and at normal play speed of 1¾ inches/second requires 1.5 seconds/revolution. The winding diameter of the take-up reel, of course, grows as tape builds up on the reel until when full the diameter is approximately 2 inches and the distance of tape movement per revolution is approximately 6 inches. To reach the half full condition, with equal amounts of tape on both reels, requires more than half the approximately 850 revolutions to transfer the full length of tape from the supply reel to the take-up reel, because of the gradual increase in diameter of the winding on the take-up reel. Thus, if distance to the end of the tape on the supply reel is plotted on the abscissa (in terms of time), and expected reel pulse count to the end of the tape on the supply reel on the ordinate, the correlation approximately graphically represented in FIG. 7 is obtained.

A hyperbolic curve is obtained which may be approximately and conveniently represented by two straight line segments, as shown in FIG. 7. By storing coded signals representing this curve in the "Pulse Count Store" in memory, pulse count for any given tape position may be derived, or the inverse thereof, and the difference in pulse count between any two positions may be determined by a process of subtraction of one pulse count value determined from the curve from another also determined from the curve. An unknown position may be determined from the pulse count curve based on one position which is known and total measured pulse count between the known and the unknown position.

In keeping with the invention, therefore, having the previous display position and the number of elapsed pulses since, as indicated in FIG. 14 an estimated final position is obtained by recalling the tape position from the pulse count store for the designated cassette, in the memory unit 40. The estimated position is displayed as a "best" position and the program returns to the program for the designated function. If entering play or record functions, for example, the CPU under control of that program routinely determines positions every two reel revolutions and the display will then be updated from the "best" position and smoothly operated to display tape position in synchronism with tape movement as tape is driven to normal speed.

SEARCH FOR TARGET POSITIONS (FIGS. 6, 7, 15)

In accordance with an important aspect of the invention, methods and means are provided for automatically searching for target positions inserted by the operator through activating the digit keys of the keyboard.

As hereinbefore explained, tape position determinations are based on reel speed ratios $P_1/P_2$ measured by timing (at normal speed) two revolutions of each reel, using high frequency pulses clocked into timing registers. Using high frequency clock pulses to measure real time for two revolutions of each reel, provides an accurate representation of average speed for the two revolutions, and an accurate determination of tape position can thus be made based on reel speed ratios every two reel revolutions or 6 to 8 seconds at normal tape speed.

It appears that making periodic, spaced measurements of reel speed ratios limits the system of this invention to accurately determining, based on such speed ratios, tape positions spaced twice the circumferential distance of windings on a reel. Unexpectedly, however, in accordance with a further important aspect of the invention, positions intermediate the accurately determined spaced positions are located based on expected reel pulse counts derived from the pulse count curves stored in memory, thus providing a more accurate method of determining tape position than one based on calculation alone.

As one important application of the invention, it provides high speed random access to any target position on the tape, using position determinations by calculation to within approximately 15 seconds preceding the target position, and finding the target position by counting pulses from the determined position to reach the target position.

Figure 6:
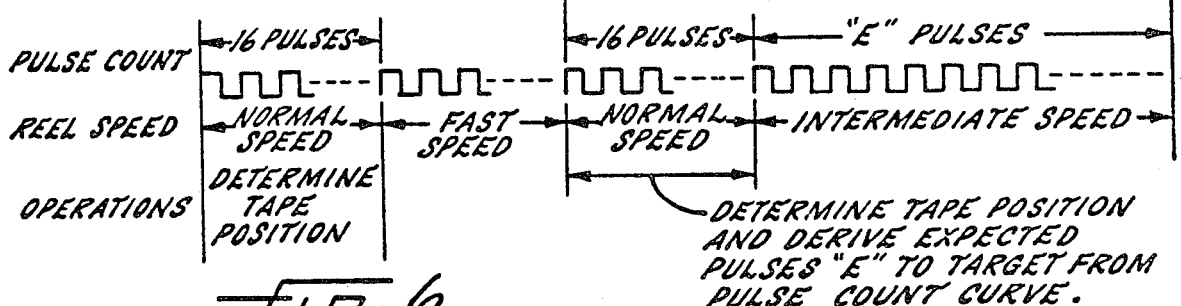
FIG. 6 is a timing diagram illustrating pulse count, reel speed and operations performed in the programmed operation of the microprocesser in the search mode to find a target position.

Referring to FIG. 6, this is a timing diagram showing the preferred mode of operation of the CPU 38 under pressure control, to control the drive motors M1, M2 of the tape transport apparatus and monitor the movement of the tape on the display 68 to reach a target position pre-set by the operator using the keyboard. Thus, as shown in FIG. 6, if the tape position is unknown (i.e. if the cassette has just been inserted) the tape is driven at normal speed for a position determination (period of 16 pulses from the reel pulse generators), otherwise the tape is driven at fast speed until twenty seconds from the target position, then at normal speed for determinating an accurate tape position, and then at intermediate speed until the target position is reached. It will also be noted the target position is reached with the tape driven at intermediate speed and the controller using expected reel pulse counts from the Reel Pulse Count Store to accurately determine the length of tape to be driven to reach the target position.

Now turning to FIG. 15, which is a simplified flow diagram of the program steps the CPU 38 executes in the search process, as there shown, on entering the search mode the display and controls are set, and the question is asked "Is Position Accurate?" If "no" an accurate position is determined and the display shows a measured and, therefore, accurate position. If not within 15 seconds of the target, controller 36 connects the take-up drive motor (M1 or M2) in the fast forward or rewind direction to the high voltage of 12 volts, by operating one of the relays 84 or 86 in the motor control circuit 66 over line P5-6 or P5-4, to cause the motor M1 or M2 to operate at maximum speed and move the tape at fast speed toward the target position.

When within 20 seconds of target position as determined from the continually updated display of tape position based on periodic position determinations made every four revolutions during the fast speed operation, the take-up drive motor is reduced to normal speed, indicated by the program step in FIG. 15 "Within 20 Seconds of Target?". Based on a reel speed ratio calculated following the elapsed period of 16 reel pulses (see FIG. 6), an accurate tape position determination is then made. A calculation is then made of pulses expected to the target position, by determining the difference between the expected pulse count at the accurately determined position and the pulse count expected at the target position, by reading data from the Pulse Count Store. The tape drive motor is then switched to intermediate speed by connecting the windings of the take-off motor to ground. This connection to ground creates a braking action which reduces tape speed, and is achieved by energizing relays of the motor control circuit 66 via output lines connected to the processor ports. When the target position is reached, the function designated by the operator through activating one of the function keys of the keyboard is then entered.

DISPLAY SMOOTHING AND SYNCHRONIZATION (FIGS. 10, 11, 11A)

In the system of the commonly assigned prior patent application previously referred to, the controller updates the display of tape position based on periodic determinations of instantaneous positions of the tape. Considering the system constructed as preferred, in which tape position is displayed in terms of time to the end of the tape, if the tape position determination is repeated approximately every 6-8 seconds representing the rotation through two revolutions of both reels where both reels are half full of tape, if the display is updated to show the tape position after each cycle of determination the display will jump 6-8 seconds at a time, and the jumps may be somewhat uneven.

In keeping with the present invention, a method and means are provided for operating the display so that it is uniformly and smoothly updated to show changes in tape position of one second, the display being operated by a display clock in the intervals between tape position determinations, and the rate of the display clock being synchronized with the actual rate of movement of the tape by comparing the tape position as determined each cycle, with the tape position shown on the display, and changing the rate of the display clock to eliminate any difference between the calculated position and the display position over a prolonged interval, to smooth out the operation of the display.

Figure 10:
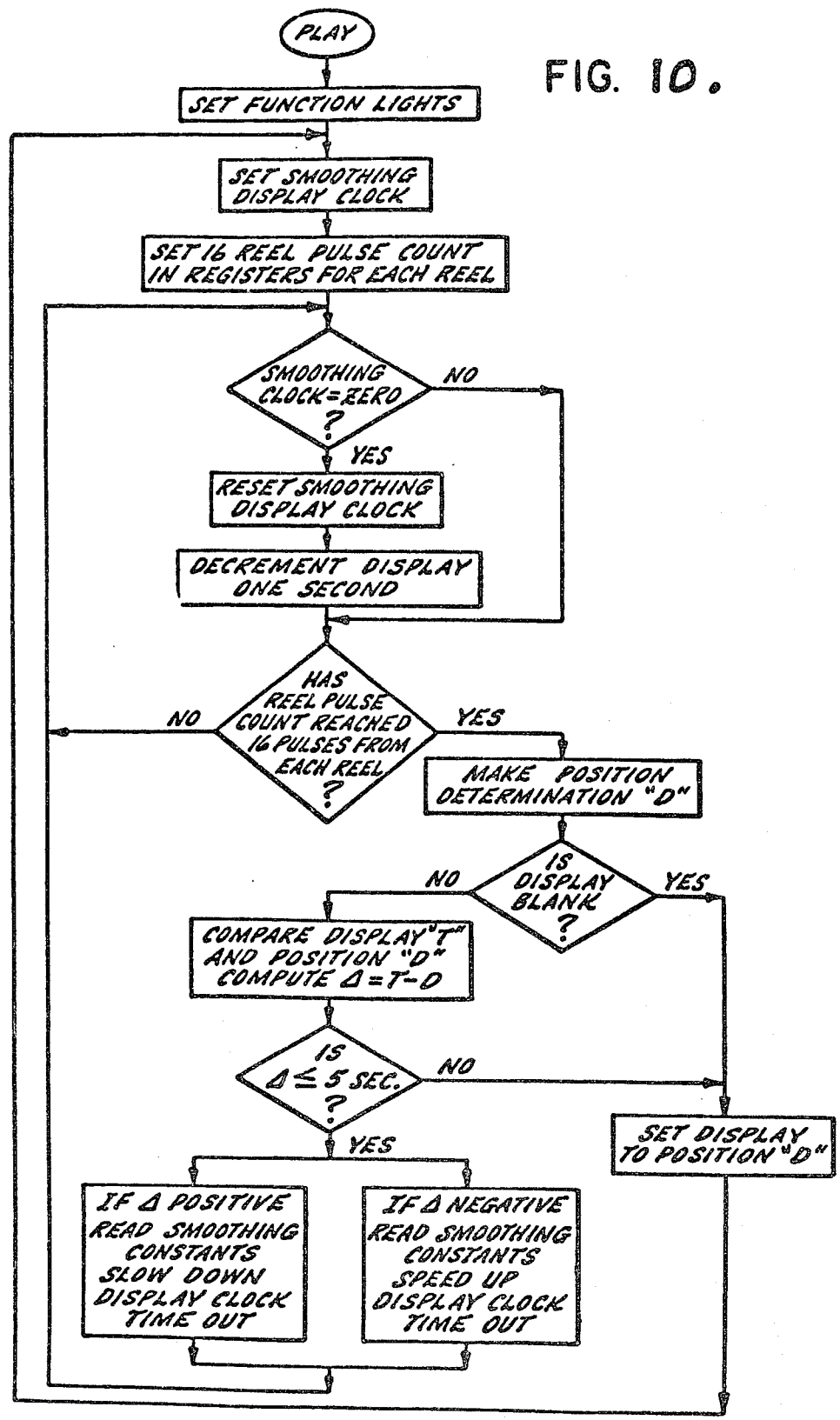
FIG. 10 is a simplified flow diagram of a preferred program for the CPU to execute operations to control the tape transport in the play function, and illustrates particularly the operations in making tape position determinations, and synchronizing the position shown in the display with the movement of the tape.

An illustrative simplified program flow chart (FIG. 10) illustrates the programmed operation of the CPU 38 to drive the display 68 in this manner, it being understood that a program will be stored in the program section of the memory unit 40 to operate the CPU 38, as will be clear to a man skilled in this art. Turning first to FIG. 1, to drive the display 68 combinations of output signals on the output line 70, 72 from I/O port 64 are connected to the circuits of the display 50 which may be an LCD or LED display unit of four digits to display minutes and seconds. The CPU 38 and memory 40 may provide the requisite decoder circuits to drive the display directly when Mostek F8 integrated circuits are used, or decoder circuits separate from the controller 36 may be provided where the controller is implemented in a different manner. Preferably, and in keeping with this invention, the CPU 38 under program control provides a display clock 78 which is connected to and controls the display 68.

Referring to FIG. 12, as there shown the main programmed operation of the CPU 38 is interrupted on a regular real time cycle by a timer interrupt request. The display clock 78 may be implemented by a register of the CPU 38 or RAM memory of the memory unit 40, which register is initially set to a value or content, and is decremented each cycle of the timer interrupt request, for example every 8 ms., so that in the absence of adjustment the register times out each second and the display clock updates the display once each second. The nominal value loaded in the register is 125, 125 counts of 8 ms. giving one second decrementation. Due to time interrupts and other time consuming operations, the central value is 122 not 125. The time out of the display clock register, and thus the rate at which the display clock updates the display, is speeded up or slowed down, in accordance with the present invention, by loading the display clock register with a value greater or less than the central value by an amount which varies according to the sense and magnitude of the difference between the position shown on the display clock and the actual position of the tape as determined each cycle by the controller. The value loaded in the register is read from memory as indicated in FIGS. 11 and 11A, the display clock being adjusted as the difference (Δ) between the display position "T" and the actual position "D" varies within a limit plus or minus 5 seconds. As indicated in FIG. 11, the display clock is slowed down if Δ is greater than zero (within the 5 seconds), the calculation for the digital value to be added to the content of the register being based on smoothing constants that are indicated in FIGS. 11 and 11A. Thus if Δ is plus or minus less than 1 second, the constants value is 122, representing a median value for basing the calculation to adjust the time out of the display clock register. As indicated, the constants value increases and decreases incrementally as Δ varies in one second increments. As shown in FIG. 11A, if Δ is less than zero the value of the constants read from memory are from 122 to 91; as shown in FIG. 11 if Δ is greater than zero the constants read from memory are from 140 to 210.

Again referring to FIG. 10, in somewhat more detail, in response to operator initiation of the play function, the system enters the play mode of operation the function lights are set by the controllers 30, 36, and as indicated in the block "Set Smoothing Display Clock" an initial value is set into the register serving the function of the display clock. The display clock register is therefore set to a content such that it will clock the display to update the display on a one second interval. As indicated in the next block in the flow chart, a 16 reel pulse count is set in registers for each reel. This is to initialize the circuits for timing the period of two revolutions of each reel. For this purpose, the stream of reel pulses issued from each reel pulse generator is counted until a total of 16 pulses, representing two revolutions of the associated reel, has been received. As indicated in FIG. 12, in response to a timer interrupt, when a reel I pulse is received by the controller on an input line, the reel pulse count in the register is decremented, and this process continues until the count equals zero. The period for 16 pulses is thus timed by feeding high frequency pulses to the timing register, and accumulating in the timing register the high frequency pulses for the period of 16 reel pulses. As indicated in FIG. 12 when the count in the reel pulse count register equals zero, the timing register contents are transferred to a time store register where the contents are stored. The same sequence, as indicated in FIG. 12, is carried out for reel II pulses, such that at the end of 16 pulses from each reel, the timing register contents for each reel are transferred to storage registers.

Turning back to FIG. 10, following the step of "Set 16 Reel Pulse Count in Registers for Each Reel" as there indicated the question is asked "Smoothing Clock Equals Zero?". As also indicated in the timer interrupt flow chart of FIG. 12, the smoothing display clock is decremented each timer interrupt cycle, and if the smoothing display clock has been decremented to zero, as indicated in the flow chart in FIG. 10, the smoothing display clock is reset and the display is decremented 1 second. If the smoothing clock does not equal zero, the routine jumps from "Smoothing Clock Equals Zero?" to the block "Has Reel Pulse Count Reached 16 Pulses from Each Reel?", representing that both registers for the reels have been decremented to zero and the time is ready to make position determination "D". If the display is blank, as it may be where this is the first position determination made by the controller, then the display is set to position "D"; if the display shows a position made by a prior determination, the position shown in the display "T" and the position "D" just made are compared, and the value of "Δ=T-D" is computed. If the difference between the displayed position "T" and the just determined position "D" is within ±5 seconds, then an adjustment is made of the display clock rate. If the difference between the displayed and determined position is greater than 5 seconds, the display is updated to show the newly determined position "D". Thus, smoothing of the display operation by adjusting the rate of the display clock, is only carried out when the comparison between the displayed position and the newly determined position is within a 5 second interval. As indicated also in FIGS. 11 and 11A, if upon comparison the difference between the displayed position "T" and the freshly determined position "D" is greater than zero but within 5 seconds, smoothing constants are then read from memory and the display clock is slowed down by changing the content of the register serving the function of the display clock by a value calculated based on smoothing constants the value of which correspond to the increment of difference between zero and 5 seconds. Similarly, if Δ is less than zero but within 5 seconds, the clock is speeded up so as to bring the display into synchronism with the actual position of the tape over a prolonged interval. Preferably the prolonged interval is on the order of 15 seconds, the digital value to be added to the content of the display clock register being calculated to change the rate of the display clock in a smooth manner so as to avoid any abrupt and noticeable increase or decrease in the normally one second changes in position shown on the display.

CONTROL OF SUPPLY VOLTAGE TO MOTORS (FIGS. 1-3, 7, 8, 16)

Figure 8:
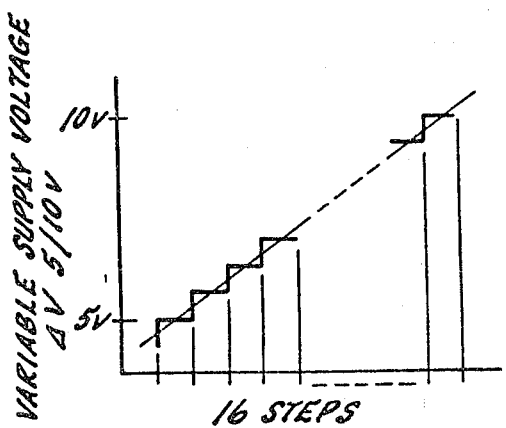
FIG. 8 is a graphical representation of the multiple levels of supply voltage $\Delta V$ for the take-up drive motor.
Figure 16:
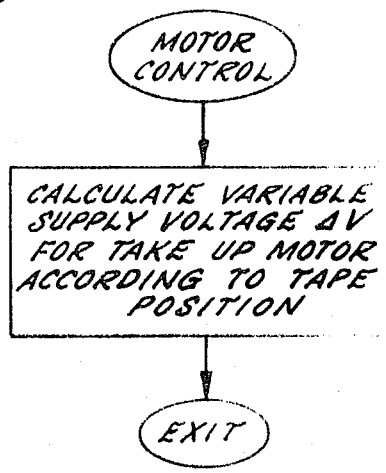
FIG. 16 is a simplified flow diagram of a program for the CPU to control the take-up drive motor in accordance with tape position.

According to this invention, method and means are provided to control the supply voltage to the drive motors M1 or M2 for monitoring the movement of the tape in accordance with tape position. A feature provided by this aspect of the invention, is the regulation of output torque of the take-up motor M1 to maintain substantially constant tension or tractive force applied to the tape by the drive motor on the take-up reel throughout the entire process of transferring tape from reel to reel when moved at normal speed for play or record. For this purpose, the controller 36 calculates the desired supply voltage based on tape position and produces signals on the lines P1-0 to P1-3 which in digital form represent the calculated variable supply voltage to maintain constant tractive force, and means are provided herein shown in FIG. 1 as the circuit 80 which takes the output in digital form from the CPU 38, converts it to an approximately linearly varying supply voltage ΔV for the take-up motor M1 as shown in FIG. 8. The controller 36, as indicated in the flow diagram FIG. 16, determines the requisite supply voltage to the drive motor M1 to provide a variable torque which increases and decreases in approximate proportion to the radius of the tape, winding on the take-up reel, which is a linear function of tape position.

The supply voltage control circuit 80 of FIG. 1 can be considered, in simplified terms, to comprise means for converting a digital signal on the output pins P1-0 to P1-3 of the CPU 38, to an analog voltage applied to the take-up reel drive motor and varying through sixteen voltage levels approximating a linear voltage change between 5 and 10 volts (as shown in FIG. 8), as the digital output from the CPU 38 is varied as represented by combinations of high and low voltages on the pins P1-0 to P1-3 of the CPU. The circuit 80 includes an array of resistances 84 of 5K, 10K, 20K and 40K ohms connected in parallel to the output pins of the CPU as indicated in FIG. 1, operational amplifiers 86, and an output transistor 88 to supply the output voltage at the CPU controlled level to the motor M1 for the take-up reel. The variable supply voltage is connected to the motor M1 when the relay 82 in the motor control circuit 80 of FIG. 2, is energized by a control signal on the output line P5-7 responsive to the play or record function being initiated.

In addition to providing means for connecting and disconnecting the variable supply voltage ΔV 5/10 V. to the drive motor M1, the motor control circuit 68 also provides means to change the speed of movement of the tape between normal and fast speed in response to manual activation and deactivation of fast speed controls or programmed controlled operation. This motor control circuit includes the relay 84 to connect 12 volts for fast speed of the forward motor M1 in response to an output signal from the controller 36 on the output line connected to the controller port P5-6. A signal over the output line connected to the controller port P5-4 energizes the relay 86 to connect the 12 volt source to the rewind drive motor M2 and to cause the drive motor M2 to operate at fast speed. For applying dynamic braking forces to the supply reel in the forward or rewind directions, output signals over the lines connected to the output ports P5-1 or P5-5 operate respectively relays 88, 90 to connect the motor windings of the motors M2 or M1 to ground through the resistances 93, 94. A signal on the output line connected to port P5-7 is operative both to connect the variable supply voltage Δ5 5/10 volts to the forward drive motor M1, and to operate the relay 92 to energize the solenoid "sol." to engage the capstan drive for the tape. With the control of the variable supply voltage ΔV 5/10 volts by the controller 36 and the network 80, and the control of the application to the motor windings of the standard 5 and 12 volt sources, means are thus provided to control the speed of motors M1 or M2 to maintain normal speed for play and record modes, intermediate speed for slow-down and end-of-search sequence and fast speed for fast forward or rewind in response to both manual controls and automatically in accordance with tape position.

I claim as my invention:

1. A method of monitoring tape movement in tape transport apparatus for tape/reel assemblies having two reels, said apparatus having drive means for moving the tape from reel to reel, and means generating reel pulses responsive to rotation of each reel as tape is moved by said drive means, comprising:
   providing dedicated memory means storing signals correlating number of reel pulses and tape positions from one end of the tape to the other,
   deriving from said memory means signals representing pulse count based on known tape positions to tape positions based on known pulse counts, and
   controlling said apparatus to monitor tape movement in accordance with pulse count or tape position derived from said memory means.

2. A method of monitoring tape movement in tape transport apparatus for cassettes having drive means for moving the tape from reel to reel, and means generating a fixed number of reel pulses each revolution of each reel, comprising:
proventioning dedicated memory means storing signals correlating number of reel pulses and tape positions from one end of the tape to the other,
deriving from said memory means signals representing expected pulse count between a first position and a second position of the tape,
counting reel pulses from said generating means as tape is moved by said drive means from said first to said second position, and
controlling said drive means to monitor tape movement between said first and second positions based on the reel pulse count and the expected pulse count.

3. A method according to claim 2 wherein said step of controlling said drive means includes stopping the tape at the given position when the reel pulse count equals the expected pulse count.

4. A method of monitoring tape movement in tape transport apparatus for cassettes, having drive means for moving the tape from reel to reel, and means generating a fixed number of reel pulses each revolution of each reel, comprising:
providing dedicated memory means storing signals correlating number of reel pulses and tape positions from one end of the tape to the other,
deriving reel rotational speeds from reel pulses generating by said generating means,
determining a first tape position based on rotational speeds of the reels,
deriving from said memory means signals representing expected pulse count between a given position and said first position,
counting reel pulses from said generating means as tape is moved by said drive means between said first and given positions, and
controlling said drive means to monitor tape movement between said first and given positions based on the reel pulse count and the expected pulse count.

5. In a tape transport apparatus for cassettes having two reels carrying tape, said apparatus having drive means for moving the tape from reel to reel, reel speed detectors including means generating a predetermined number of reel pulses per revolution of each reel, and controller means connected to said drive means and monitoring tape movement based on the speeds of the reels provided by said detectors, the combination in said controller means comprising:
dedicated memory means storing signals correlating expected number of reel pulses and tape positions from one end of the tape to the other,
means deriving from said memory means expected pulse count for one of said reels between a position determined by said controller means and a given position,
means counting reel pulses from said one reel as tape is moved by said drive means from said determined position toward said given position, and
means controlling said drive means to monitor the tape movement relative to said given position by comparing the reel pulse count and the expected count.

6. The combination according to claim 5 wherein said controller means includes means timing the elapsed periods of the same total count of reel pulses for each reel, and repeatedly determining the changing ratio between said elapsed periods as tape is transferred from reel to reel, and
means determining successive tape positions as tape is transferred from reel to reel employing said changing ratio determinations to represent the speed ratios of successive tape positions.

7. In a tape transport apparatus for cassettes having two reels carrying tape, said apparatus having drive means for moving the tape from reel to reel, reel speed detectors including means generating a predetermined number of reel pulses per revolution of each reel, and controller means connected to said reel detectors and said drive means, the combination in said controller means comprising:
means determining successive tape positions as tape is moved from reel to reel based on the speeds of the reels represented by reel pulses provided by said detectors,
dedicated memory means storing signals correlating expected number of reel pulses and tape positions from one end of the tape to the other,
means counting reel pulses from said generating means as tape is moved by said drive means from reel to reel, and
means controlling said drive means to move the tape relative to a given position with the combination of position determinations and expected reel pulse count from said memory means.

8. The combination according to claim 7 wherein said counting means is operative to count reel pulses as tape is moved by said drive means to an unknown position from a previously determined position, and said controller means includes
means deriving the location of said unknown position from said memory means based on the reel pulse count counted off from said previously determined position.

9. The combination according to claim 7, wherein said counting means is operative to count pulses between successive positions, and said controller means includes
means deriving from said memory means the location of an unknown position intermediate successive determined positions based on the reel pulse count counted off following a previously determined position.

10. In a tape transport apparatus for tape/reel assemblies having two reels, said apparatus having drive means for the tape controllable to vary speed of tape movement, means generating reel pulses representing reel rotation, controller means connected to said reel pulse generators and said tape drive means, said controller means including a processor unit, program memory storing programs operating said processor unit to determine successive tape positions as the tape is moved from reel to reel at normal or fast speeds, based on reel speeds from said pulse generators, and to control said drive means to carry out a search sequence of tape movement, including controlling said drive means to move said tape toward a target tape position at fast speed and shift said drive means to reduce tape speed a known distance ahead of said target position,
the improvements in said controller means including a pulse count store storing signals correlating reel pulse count and tape positions from one end of the tape to the other, and programs stored in said program memory controlling said processor unit in said search sequence
- to determine successive tape positions as the tape is moved at normal speed through said known distance to said target position,
- to derive from said pulse count store expected pulse count to said target position from a position determined by said processor unit and within said known distance,
- to count reel pulses from said generating means as the tape is moved toward said target position, and
- to determine that the tape has reached said target position and controlling the operation of said drive means upon the reel pulse count equalling said expected pulse count.

* * * * *